US010740522B1

(12) United States Patent
Kim

(10) Patent No.: US 10,740,522 B1
(45) Date of Patent: Aug. 11, 2020

(54) APPARATUS AND METHOD OF OPERATING TIMING ANALYSIS CONSIDERING MULTI-INPUT SWITCHING

(71) Applicant: SAMSUNG ELECTRONICS CO., LTD., Suwon-si, Gyeonggi-do (KR)

(72) Inventor: Moon Su Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/547,497

(22) Filed: Aug. 21, 2019

(30) Foreign Application Priority Data

Jan. 25, 2019 (KR) .......................... 10-2019-0009811

(51) Int. Cl.
| | | |
|---|---|---|
| *G06F 17/50* | (2006.01) | |
| *G06F 30/3312* | (2020.01) | |
| *G06F 30/367* | (2020.01) | |
| *G06F 111/10* | (2020.01) | |
| *G06F 115/10* | (2020.01) | |
| *G06F 119/12* | (2020.01) | |
| *G06F 30/398* | (2020.01) | |
| *G06F 30/373* | (2020.01) | |

(52) U.S. Cl.
CPC ........ *G06F 30/3312* (2020.01); *G06F 30/367* (2020.01); *G06F 30/373* (2020.01); *G06F 30/398* (2020.01); *G06F 2111/10* (2020.01); *G06F 2115/10* (2020.01); *G06F 2119/12* (2020.01)

(58) Field of Classification Search
CPC .. G06F 30/3312; G06F 30/367; G06F 30/373; G06F 30/398; G06F 2115/10; G06F 2111/10; G06F 2119/12
USPC ................... 716/134, 113, 108, 136; 703/16
See application file for complete search history.

(56) References Cited

U.S. PATENT DOCUMENTS

| | | | |
|---|---|---|---|
| 7,117,466 B2 | 10/2006 | Kalafala et al. | |
| 7,428,716 B2 | 9/2008 | Visweswariah | |
| 8,418,103 B2 | 4/2013 | Wang et al. | |
| 8,515,725 B2 | 8/2013 | Feldmann et al. | |
| 8,607,176 B2 * | 12/2013 | Soreff | G06F 30/3312 716/108 |
| 2003/0188276 A1 | 10/2003 | Pie et al. | |
| 2008/0134184 A1 | 6/2008 | Fedorova | |
| 2010/0313176 A1 | 12/2010 | Takahashi et al. | |
| 2012/0266119 A1 * | 10/2012 | Soreff | G06F 30/3312 716/108 |
| 2016/0085895 A1 | 3/2016 | Hathaway et al. | |

* cited by examiner

*Primary Examiner* — Phallaka Kik
(74) *Attorney, Agent, or Firm* — Volentine, Whitt & Francos, PLLC

(57) ABSTRACT

An apparatus for operation timing analysis of a semiconductor device considering multi-input switching (MIS) includes a timing input unit that generates an MIS model of each of a plurality of cells constituting a semiconductor device, and an MIS analyzer that receives timing data of each of the plurality of cells and dynamically calculates an MIS coefficient on the basis of the MIS model and the timing data.

20 Claims, 6 Drawing Sheets

<ARRIVAL WINDOW OF EACH PIN>

US 10,740,522 B1

APPARATUS AND METHOD OF OPERATING TIMING ANALYSIS CONSIDERING MULTI-INPUT SWITCHING

CROSS-REFERENCE TO RELATED APPLICATION

This U.S. non-provisional patent application claims priority under 35 U.S.C. § 119 to Korean Patent Application No. 10-2019-0009811, filed on Jan. 25, 2019 in the Korean Intellectual Property Office (KIPO), the subject matter of which is hereby incorporated by reference.

BACKGROUND

1. Field

Embodiments of the inventive concept relate to apparatus(es) and method(s) providing operation timing analysis in relation to semiconductor devices including elements or components providing multi-input switching (MIS).

2. Discussion of Related Art

Contemporary semiconductor devices are amazingly complex in their design, performance characterization, fabrication and operation. A great variety electrical signals are generated, transmitted, routed, and received (hereafter generically, "communicated") among various circuits, sub-circuits, components, circuit elements, etc. (hereafter generically, "elements"). Exemplary semiconductor elements include at least logic elements such as AND, NAND, OR, NOR gates, as well as combinations of the same (e.g., so-called "AND-OR-Invert" or "AOI" gates).

Some semiconductor elements receive only a single signal input (Single-Input Switching or SIS), while other semiconductor elements receive multiple signal inputs (Multi-Input Switching or MIS). Here, many MIS elements include multiple transistors that operate in parallel in response to one or more signals. Generally speaking, signal delay(s) associated with MIS elements is shorter than cell delay(s) associated with SIS elements.

Given the overall complexity involved in the design of contemporary semiconductor devices, it is not surprising that many automated tools are used during the process. In such electronic design automatic (EDA) tools various signal propagation considerations and signal timing relationships must be understood to improve the overall performance of the resulting semiconductor devices. Unfortunately, much of the signal performance analysis for many semiconductor elements (e.g., logic cell) make assumptions predicated upon SIS element behavior. Accordingly, the analysis arising from these assumptions may not accurately reflect the real world operation of MIS elements. In extreme cases, poorly understood and inadequately designed semiconductor performance may lead to operating failures (e.g., signal hold time failures).

SUMMARY

Embodiments of the inventive concept provide apparatuses and methods of modeling multi-input switching (MIS) elements (e.g., logic gates or cells) in a semiconductor device.

Embodiments of the inventive concept provide an MIS analysis apparatus and method of a semiconductor device capable of improving accuracy and efficiency of operation timing analysis by accurately reflecting MIS analysis when analyzing an operation timing of the semiconductor device using a graph-based analysis (GBA) method.

An apparatus of operation timing analysis for a semiconductor device including MIS elements according to embodiments of the inventive concept include a timing input unit and an MIS analyzer. The timing input unit generates an MIS model of each of a plurality of cells constituting a semiconductor device. The MIS analyzer receives timing data of each of the plurality of cells and dynamically calculates an MIS coefficient on the basis of the MIS model and the timing data.

An apparatus of operation timing analysis for a semiconductor device considering MIS effects according to embodiments of the inventive concept includes a static timing analysis (STA) module and an MIS analyzer. The STA module generates timing data of each of a plurality of cells constituting a semiconductor device. The MIS analyzer receives an MIS model of each of the plurality of cells and dynamically calculates an MIS coefficient on the basis of the MIS model and the timing data.

A method of operation timing analysis of a semiconductor device including MIS elements according to embodiments of the inventive concept includes generating a model of each of a plurality MIS elements, generating timing data without considering MIS effects for each of the MIS elements, calculating an MIS coefficient of each of the MIS elements on the basis of the MIS model and the timing data, and performing STA for each of the MIS elements in consideration of MIS effect on the basis of the MIS coefficient.

The above and other objects, features and advantages of the present inventive concept will become more apparent to those of ordinary skill in the art by describing exemplary embodiments thereof in detail with reference to the accompanying drawings, in which:

DETAILED DESCRIPTION

Certain embodiments of the inventive concept will now be described with reference to the accompanying drawings. As descriptive examples these embodiments teach at least the making and use of certain operation timing analysis apparatuses as well as corresponding methods. Here, the operation timing analysis apparatus and/or method may be advantageously applied to the design, performance characterization, fabrication and/or analysis of semiconductor devices, and particularly semiconductor devices including MIS element(s).

A certain phenomenon associated with the operation of MIS elements has previously been noted. That is, when multiple transistors are simultaneously switched in a MIS element, a signal delay (i.e., a time period required for signal propagation through the an element) for a MIS element is less than an analogous signal delay for a SIS element. Hence, when conventional operation timing analysis—that fails to accurately differentiate between MIS element signal delay(s) and SIS element signal delay(s)—is performed on certain semiconductor devices, erroneous signal timing conclusions may be reached. As a result, actual operation timing varies from expected (or design-designated) operation timing, and such variations may lead to semiconductor device failures.

With these potentially undesirable outcomes in mind, certain embodiments of the inventive concept provide operation timing analysis apparatuses and/or methods that properly take into account the presence and actual operation of MIS element(s) within a semiconductor device. In one related approach, one or more MIS coefficients designated as inputs to the operation timing analysis may be used. For example, when input signal arrival times overlap, a corresponding signal delay may be reduced by applying (e.g., multiplying) the MIS coefficient(s) such that the MIS phenomenon is accounted for and input signal arrival times are defined such that they do not arrive in an overlapping manner.

In another related approach, when overlapping timing windows for signals applied to the input pins of a semiconductor device are present the MIS coefficients may be used to properly modify static timing analysis (STA).

An apparatus and method for operation timing analysis of a semiconductor device according to embodiments of the inventive concept may calculate the MIS coefficients using various timing information and a composite current source (CCS) to accurately reflect the MIS phenomenon. Further, when graph-based analysis (GBA) for operation timing analysis is performed, unnecessary elements may be eliminated by optimizing a minimum operation.

Figure 1:
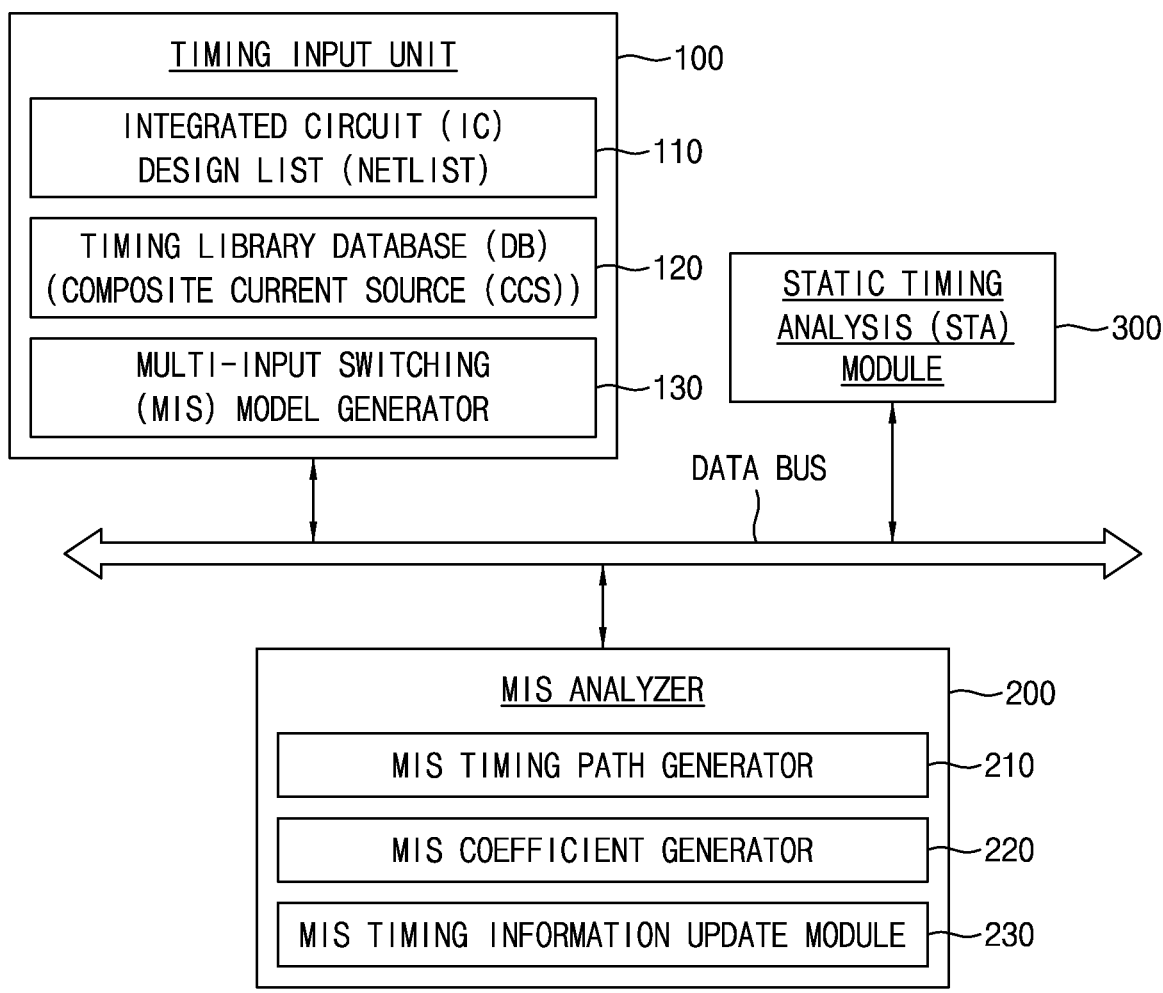
FIG. 1 is a block diagram illustrating an operation timing analysis apparatus of a semiconductor device accurately reflecting MIS effects according to an embodiment of the inventive concept.

FIG. 1 is a block diagram illustrating an operation timing analysis apparatus of a semiconductor device that may be used to accurately reflect the MIS phenomenon according to an embodiment of the inventive concept.

Referring to FIG. 1, an operation timing analysis apparatus 10 may include a timing input unit 100, an MIS analyzer 200, and a Static Timing Analysis (STA) module 300. The timing input unit 100 may include an integrated circuit (IC) design list 110 (e.g., a netlist), a timing library database (DB) 120, and an MIS model generator 130. The MIS analyzer 200 may include an MIS timing path generator 210, an MIS coefficient generator 220, and an MIS timing information update module 230.

The components constituting the timing input unit 100, MIS analyzer 200 and STA module of the operation timing analysis apparatus 10 may be variously configured using software, hardware and/or firmware. For example, the operation timing analysis apparatus 10 of FIG. 1 may be implemented on a general purpose computational platform (e.g., a PC, laptop, tablet or smart phone) as one or more software programs.

Figure 2:
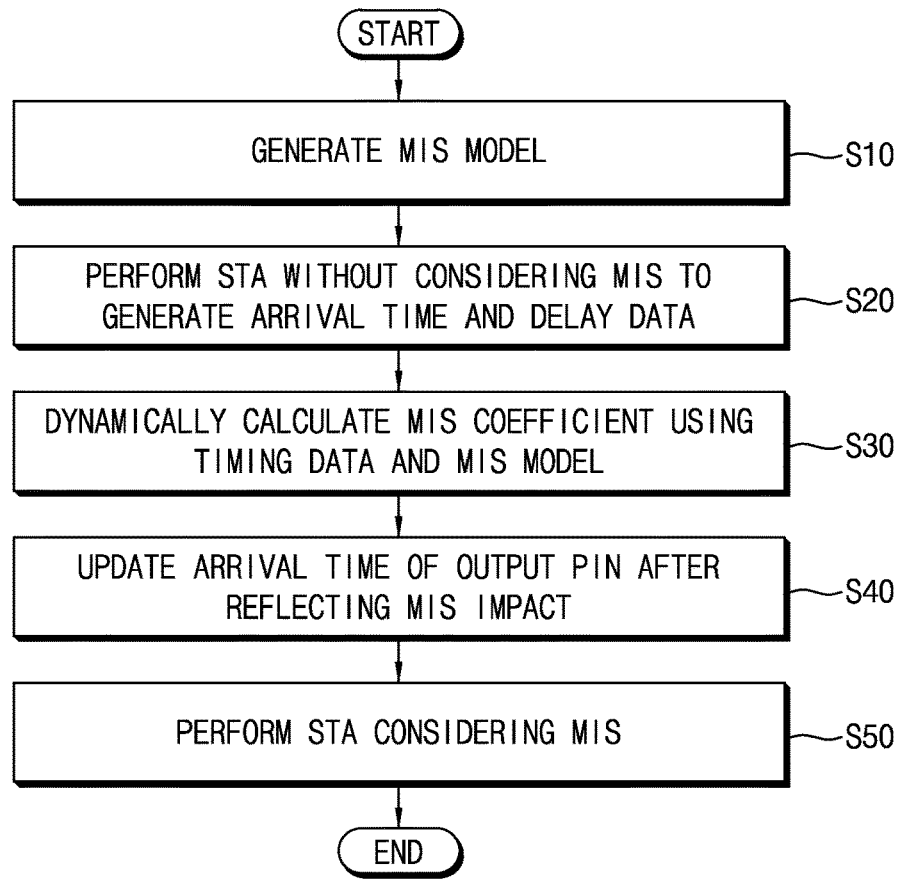
FIG. 2 is a flowchart summarizing in one example a method of analyzing an operation timing of a semiconductor device reflecting MIS effects.
Figure 3:
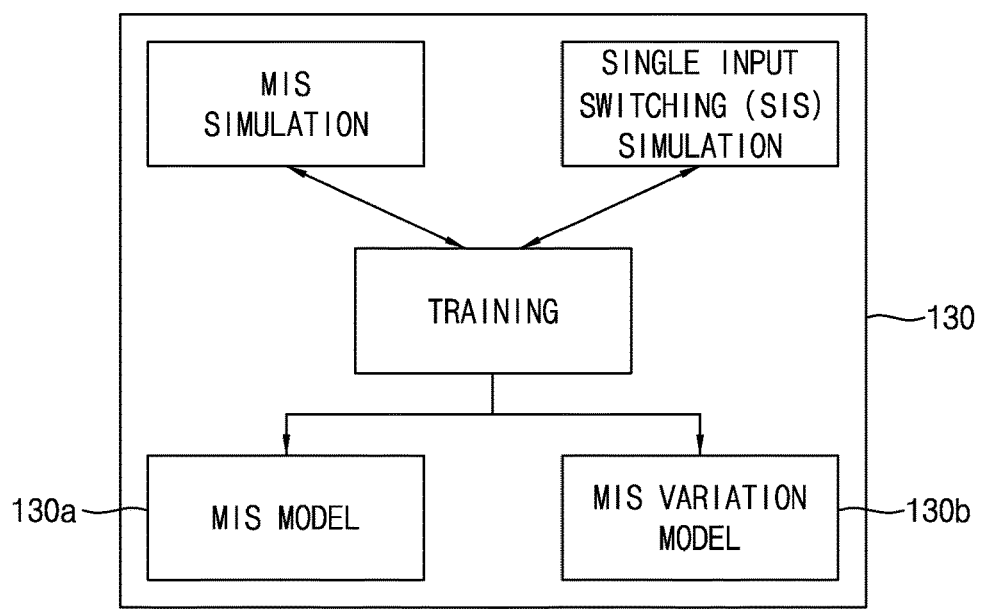
FIG. 3 is a conceptual view illustrating in one example a driving method for an MIS model generator.

FIG. 2 is a flowchart illustrating in one example a method of analyzing the operation timing of a semiconductor device while accurately reflecting the MIS phenomenon. FIG. 3 is a conceptual diagram further illustrating one possible driving method for the MIS model generator 130 of FIG. 1.

Referring collectively to FIGS. 1, 2 and 3, STA may be performed using the STA module 300, provided that an accurate MIS model has been previously generated.

Hence, the timing input unit 100 may load an IC design list 110 for the semiconductor device under analysis, and also load corresponding timing information for the loaded IC design list from the timing library DB 120. Then, the MIS model generator 130 may generate an MIS model 130a on the basis of the loaded IC design list and timing information. Since effects due to the presence of MIS elements may impact not only basic cell delay, but also variation in same, an MIS variation model 130b may be generated in consideration of the variation (S10). The timing input unit 100 may generate the MIS model 130a and the MIS variation model 130b for each of a number of elements (e.g., cells or logic gates) in a semiconductor device or some portion thereof (e.g., a chip, a chip portion, a semiconductor layer, a designated circuit or circuit portion, etc.).

The timing input unit 100 may generate a learning model using both MIS simulation results and SIS simulation results as a training set for machine learning. For example, the timing input unit 100 may calculate MIS coefficients according to the following equation in order to generate the learning model:

$$y=b1*x1+b2*x2+b3*x3+b4*x4+b5,$$

wherein, 'y' is a value to be predicted, and 'x1, x2, . . . ' are independent variables impacting 'y'.

Here, the timing input unit 100 may define 'y' and 'x1, x2, . . . ' to generate training data. The timing input unit 100 may complete a function for calculating 'y' by numerically calculating 'b1, b2, . . . , b5'. The timing input unit 100 may then predict a value of 'y' when actual data is input.

The timing input unit 100 may generate a predictive model function for an on-chip variation (OCV) sigma associated with the MIS element on the basis of the training set. The timing input unit 100 may generate the MIS variation model according to a process variation on the basis of the predictive model function for the OCV sigma (OCV_sigma) of the MIS. When a nominal signal delay is shorter due to the MIS phenomenon, the OCV sigma associated with the MIS element may be smaller than a typical OCV sigma (OCV_sigma). The timing input unit 100 may generate the MIS variation model using a prediction model for the OCV sigma OCV_sigma to increase the accuracy of an MIS analysis on the MIS element (e.g., a cell).

Figure 4:
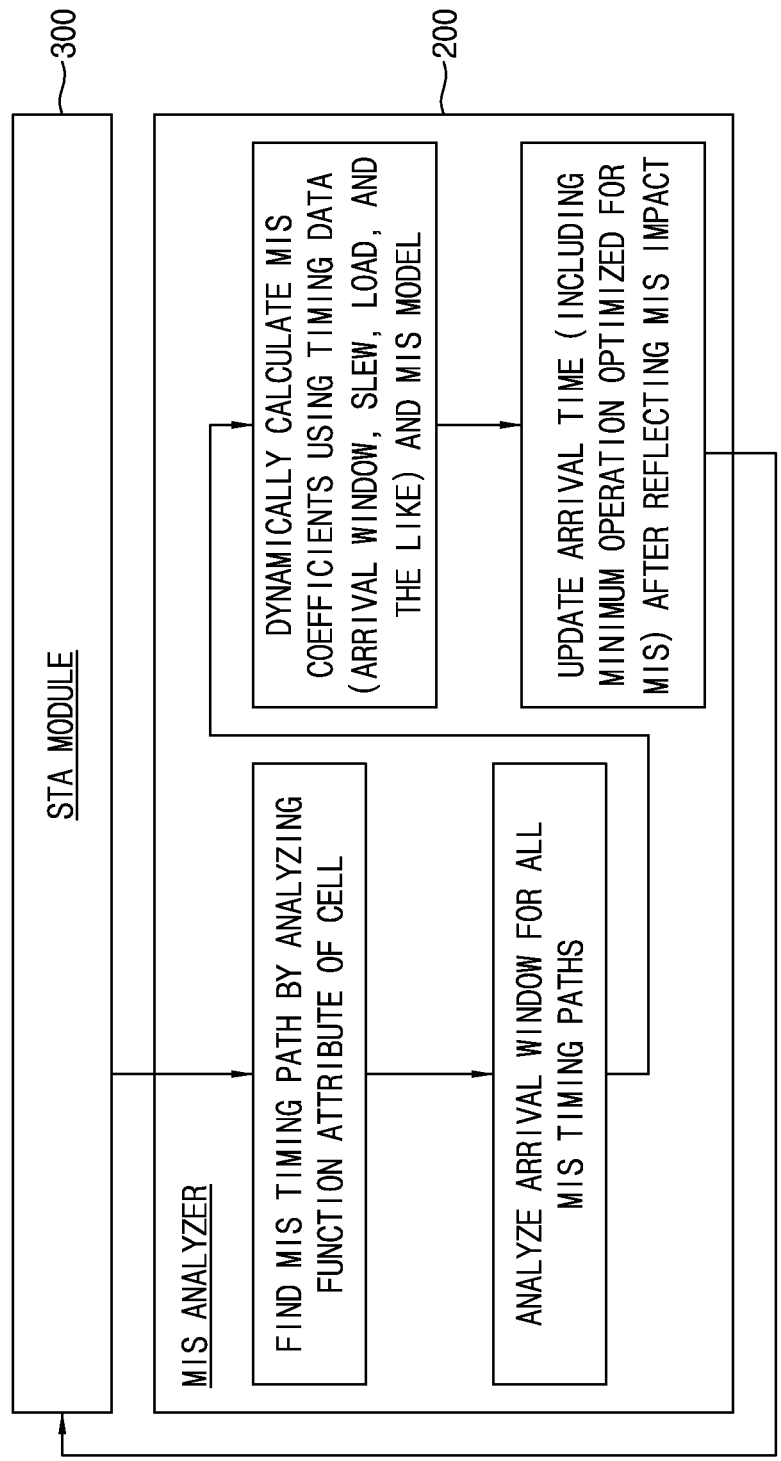
FIG. 4 is another conceptual view illustrating in one example a driving method for an MIS analyzer.

FIG. 4 is another flowchart further illustrating in one example a driving method for the MIS analyzer 200 of FIG. 1.

Referring now to FIGS. 1, 2 and 4, the STA module 300 may acquire timing data by performing the STA without considering the MIS effects (S20). The timing data acquired in the STA module 300 may include arrival time data, slew data, load data, and delay data. The STA module 300 may provide the arrival time data, the slew data, the load data, and the delay data to an MIS analyzer 200. The STA module 300 may acquire arrival time data, slew data, load data, and signal delay data for each of the plurality of MIS element(s) (e.g., a plurality of cells) constituting a portion of a semiconductor device (e.g., a chip) without considering the MIS effects.

Subsequently, the MIS analyzer 200 may dynamically calculate MIS coefficients on the basis of the MIS model generated by the timing input unit 100, and the arrival time data, the slew data, the load data, and the delay data acquired in the STA module 300 without considering the MIS effects (S30).

The MIS timing path generator 210 may acquire a timing path of the MIS by analyzing a function attribute of each of the plurality of cells constituting the chip. The MIS timing path generator 210 may acquire the timing path in which a delay may be varied due to the MIS effects. That is, the MIS timing path generator 210 may generate the timing path from an input pin of the cell to an output pin of the cell. The MIS timing path generator 210 analyzes a signal delay of output switching by two or more parallel switching inputs, and may acquire a path in which the delay is shortened by simultaneously inputting two or more signals. The MIS timing path generator 210 may acquire the timing path in which the delay is shortened due to the MIS by parsing the function attributes stored in the timing library DB 120.

The MIS coefficient generator 220 of the MIS analyzer 200 may analyze arrival windows for all of the MIS timing paths. When the STA is performed, the MIS coefficients may be applied when the timing windows of the input pins overlap each other.

The MIS coefficient generator 220 may dynamically calculate the MIS coefficients using the timing data (e.g., arrival window, slew data, load data, and the like) and the MIS model. The MIS coefficient generator 220 may merge values of a plurality of currents flowing from a plurality of input pins to a plurality of output pins of the semiconductor device to generate a merged current (i.e., merged I(t)) value. In order to generate the merged I(t), a method for merging the current values should be set in advance. In certain embodiments of the inventive concept, a merging model may be generated using a machine learning method.

Subsequently, the MIS timing information update module 230 of the MIS analyzer 200 may update arrival time of the output pin of the semiconductor device (e.g., IC chip) after reflecting the effects of the MIS (or "MIS impact") (S40). The MIS timing information update module 230 may update the arrival time of the output pin of the semiconductor device (e.g., IC chip) by reflecting the MIS impact. The MIS timing information update module 230 may include a minimum operation optimized to the MIS while updating the arrival time of the output pin. That is, the MIS timing information update module 230 may update MIS time information which includes the minimum operation indicating an input pin having minimum timing among the plurality of input pins.

Hence, a described "function attribute" may be used to represent a logical relationship between an input pin and an output pin. As one example, in the case of an AND/OR cell, an output pin Y may have the following relationship with input pins A and B.

AND(cell)*Y*=(*A* and *B*)  (Example 1)

OR(cell)*Y*=(*A* or *B*).  (Example 2)

Analysis of the function attribute(s) shows that in the case of the OR cell (Example 2), a cell delay is shortened due to the MIS when A and B are simultaneously changed to 1 (e.g., a rise-time transition).

Subsequently, the STA module 300 may perform the STA in consideration of the MIS effects (S50). As one example, the STA module 300 may analyze the arrival windows to calculate timing variations due to the MIS effects. The STA module 300 may analyze the arrival window for each pin along MIS timing paths and calculate the timing variations due to the MIS effects by applying the MIS coefficients when the arrival windows overlap each other.

When the arrival windows do not overlap each other, the STA module 300 may set the MIS coefficients to a default value (e.g., 1.0) and calculate the timing variations without taking into account the MIS effects. That is, the MIS effects may be applied not only to a default cell delay, but also to the variation. Finally, the effects due to the MIS may be reflected in the timing. When the output pins are to be merged, the STA module 300 may perform the minimum operation optimized to the MIS.

Figure 5:
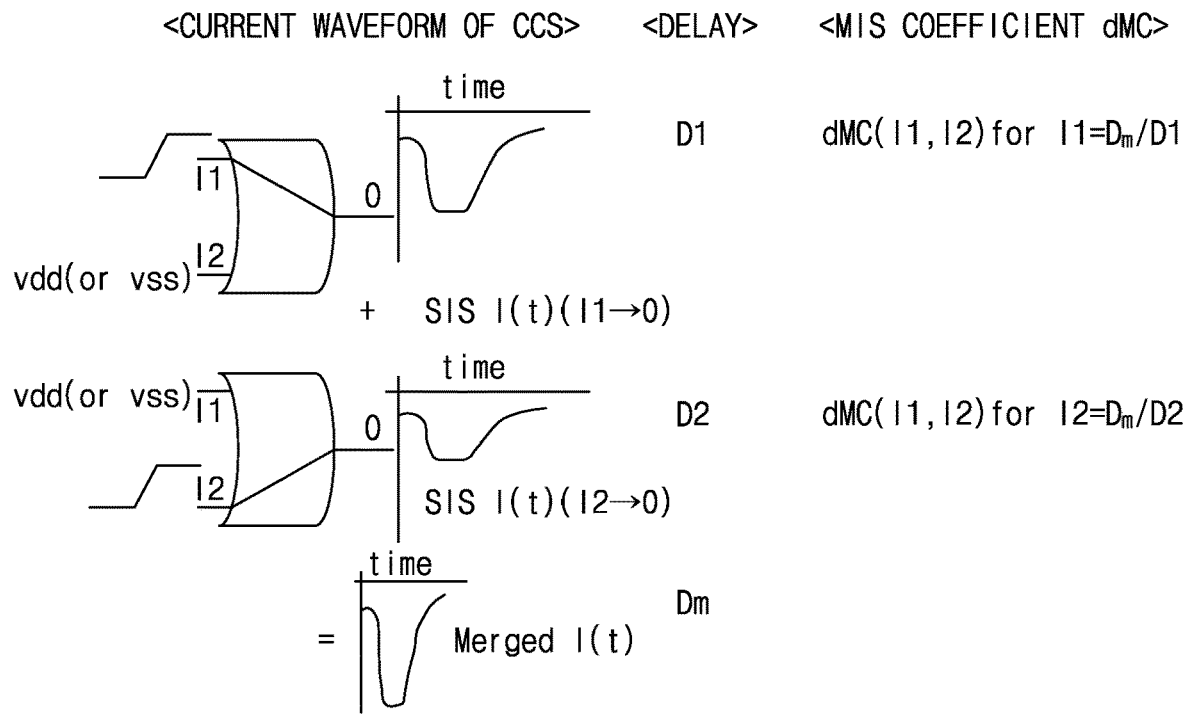
FIG. 5 is a conceptual view showing a collection of signal waveforms and a method of generating an MIS model and MIS coefficients.

FIG. 5 is a conceptual collection arrangement of signal waveforms illustrating a method of generating a MIS model and associated MIS coefficients.

Referring to FIG. 5, the operation timing analysis apparatus 10 may use a CCS model to calculate MIS effects by reflecting the pre-calculated timing information while the STA is performed.

When a transition occurs from the input pin to the output pin on the basis of the SIS, the operation timing analysis apparatus 10 of a semiconductor device may store a waveform while performing the STA.

The MIS analyzer 200 may calculate a value of a first SIS I(t) at a timing arc at which a signal flows from an input terminal I1 to an output terminal O (I1→O). The MIS analyzer 200 may calculate a value of a second SIS I(t) at a timing arc at which a signal flows from an input terminal I2 to the output terminal O (I2→O). The MIS analyzer 200 may calculate merged I(t) reflecting an MIS situation by merging the value of the first SIS I(t) and the value of the second SIS I(t).

The MIS analyzer 200 may generate dynamic MIS coefficients. The MIS analyzer 200 may assume that SIS delays are D1 and D2, respectively, and a delay of the merged I(t) is Dm. Here, the dynamic MIS coefficients may be Dm/D1 and Dm/D2 as shown in FIG. 5.

Figure 6:
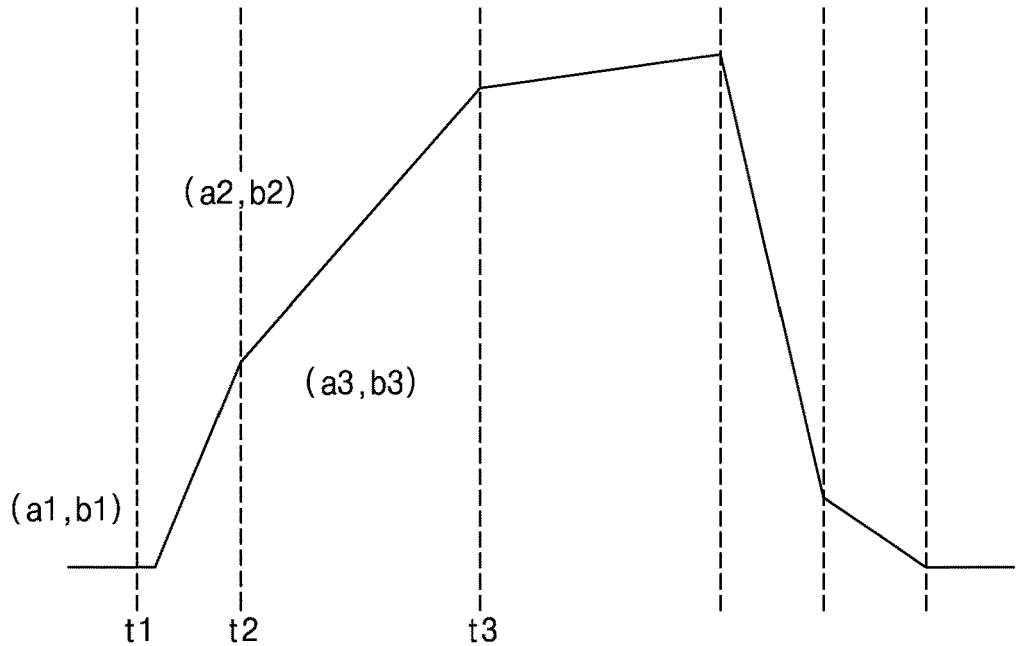
FIG. 6 is a graph further illustrating a machine learning method for generating the merging model.

FIG. 6 is a graph further describing in one example a machine learning approach to the generation of the merging model.

Referring to FIGS. 2 and 6 inclusive, the method of merging the plurality of current values to generate the merged I(t) value may be decided in advance. However, in certain embodiments of the inventive concept, the merged I(t) may be generated using a machine learning merging model.

Current may be generated and stored using a piecewise linear model, as shown in Equation 1 below. A separate linear function for time may be defined for each timing interval and represented as a non-linear waveform.

$$I(t) = \begin{cases} a_1 t + b_1 & \text{when } t < t_1 \\ a_2 t + b_2 & \text{when } t_1 \leq t \leq t_2 \\ a_3 t + b_2 & \text{when } t_2 \leq t \leq t_3 \end{cases} \quad \text{(Equation 1)}$$

Figure 7:
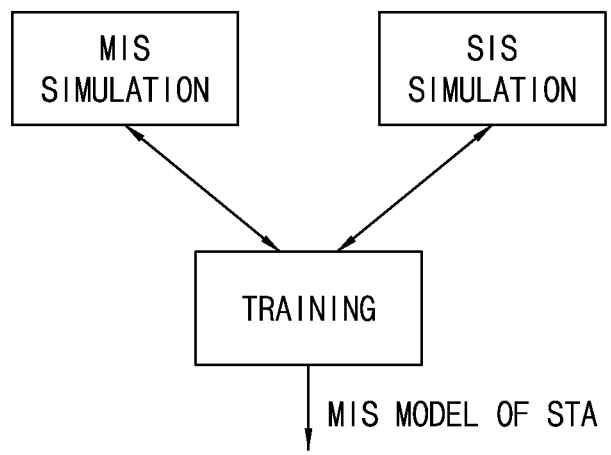
FIG. 7 is another conceptual view illustrating a method of calculating an MIS current and an MIS delay.

FIG. 7 is a conceptual view illustrating one possible method of calculating an MIS current and an MIS delay.

Referring to FIGS. 1, 2, 3 and 7, the timing input unit 100 may perform MIS simulation under various conditions. After performing the MIS simulation under the various conditions, a simulation may also be performed for the SIS. The timing input unit 100 may record results of the MIS simulation and SIS simulation as shown in Table 1 below.

TABLE 1

| time | I1o intersect | slope | I2 intersect | slope | load cap | MIS current intersect | next intersect |
|---|---|---|---|---|---|---|---|
| t1 | I1_b1 | I1_a1 | I2_b1 | I2_a1 | cap_val | I12_b1 | I12_b2 |
| t1 | I1+b1 | I1_a2 | I2+b2 | I2_a2 | cap_val | I12_b2 | I12_a3 |

↑ prediction $I_{MIS\_b_1} = 0 (t = t1)$
$I_{MIS\_b_i} = F(I1\_b_{i-1}, I1\_a_{i-1}, I2\_b_{i-1}, I2\_a_{i-1}, \ldots, I_{MIS\_b_{i-1}})(t \geq t2)$ In Table 1, load caps, and a slope and an intercept (for example, training data) of a linear function for each time interval of each SIS current may be described. A current value for each interval (for example, training data) may also be recorded for the MIS. In Table 1, 'I12(b1)' and 'I12(b2)' are output (y) of training, and the rest may be input variables impacting y.

The MIS model generator 130 may generate a model 'F', which predicts an intercept value in the next interval for an MIS element (e.g.,) for each cell on the basis of the training data.

Such a model is a result of performing the training in advance by a machine learning method using characterization data before the STA. The MIS model generated by the MIS model generator 130 may be used as an input of the STA.

When the STA is performed by the STA module 300, the timing data (arrival time data, slew data, load data, delay data) such as a load cap value and an SIS current waveform of each pin after the timing analysis may be acquired. Accordingly, the STA module 300 may predict the MIS current by applying the timing data to the generated prediction model at the time of characterization.

The STA module 300 may calculate an intercept of the MIS current. The intercept of the MIS current may be zero (0) in an initial time interval. An intercept of the MIS current in a next time interval may be calculated using a model in which one or more MIS intercepts in the previous time interval, the slope of the SIS, and the intercept of the SIS are used as inputs.

As described above, the STA module 300 may calculate the intercept of the MIS current. The STA module 300 may calculate the MIS delay through the MIS current. The dynamic MIS coefficient may be calculated from a ratio of the MIS delay to an original delay without considering the MIS.

Figure 8:
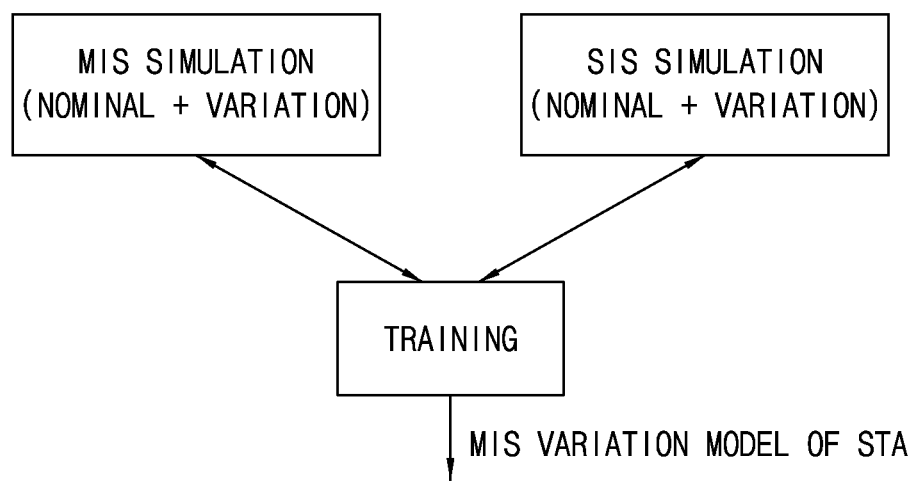
FIG. 8 is another conceptual view illustrating a method of generating a delay report for the MIS variation.

FIG. 8 is another conceptual view illustrating in one example a method of generating a delay report for the MIS variation.

Referring to FIGS. 1, 2 3 and 8, in order to consider process variations, when the STA is performed, the STA module 300 may perform analysis not only for the nominal delay but also for the variations. When the STA is performed, the STA module 300 may perform the analysis for the nominal delay and the variation to generate a 3-sigma level delay report consistent with Table 2 below.

TABLE 2

| SIS 1 | | | SIS 2 | | | load cap | MIS | |
|---|---|---|---|---|---|---|---|---|
| transition time | dely | OCV_sigma | transition time | dely | OCV_sigma | | dely | OCV_sigma |

↑ prediction

MIS_OCV_sigma = G(SIS 1_transition_time, SIS 1_delay, SIS 1_OCV_sigma, load cap, MIS + delay), where Delay_reported = delay_nominal ± 3*ocv_sigma Here, delay_nominal is a delay value when there is no process variation. An OCV sigma (OCV_sigma) may refer to a 1-sigma level of delay variation. In Table 2, 'OCV_sigma' is output (y) of training, and the rest may be input variable impacting y.

When the delay is changed due to MIS effects, the variation may also be changed. Accordingly, both issues should be considered when performing an accurate analysis.

The MIS model generator 130 may generate a training set using the results of the MIS simulation and SIS simulation. Subsequently, the MIS model generator 130 may generate a prediction model function 'G' for each cell for the OCV sigma (OCV_sigma) of the MIS using the generated training set.

The MIS analyzer 200 may calculate the MIS nominal delay using an MIS coefficient model F when performing actual timing analysis.

Further, when the nominal delay is input into a function 'G' together with SIS information of each input pin, a predicted value for the OCV sigma (OCV_sigma) of the MIS may be obtained. At this point, an MIS coefficient for the variation, that is, a dynamic MIS coefficient for variation (dMCV) may be generated. Here, the dMCV may be calculated by Equation 2 below.

$$dMCV = MIS\_OCV\_sigma / SIS\_OCV\_sigma \quad \text{Equation 2}$$

Figure 9:
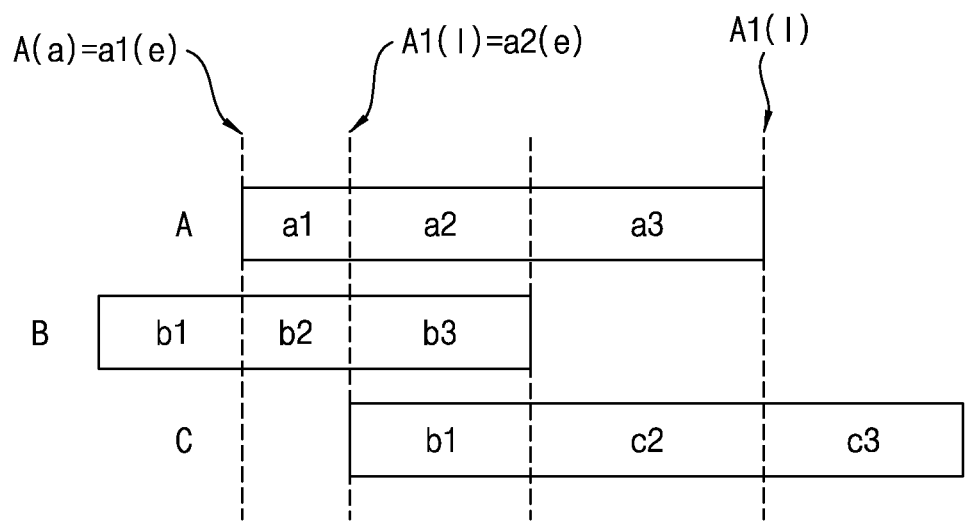
FIG. 9 is still another conceptual view illustrating a method of generating the minimum operation optimized to the MIS.
Figure 9:
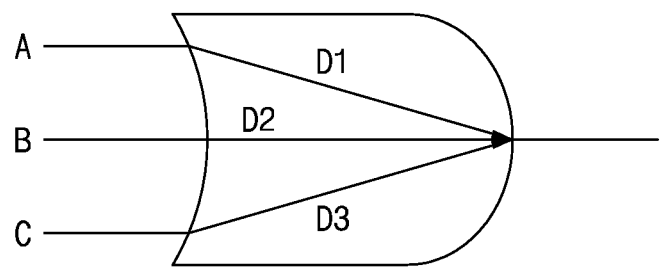

FIG. 9 is a conceptual view illustrating in one example a method of generating a minimum operation optimized to MIS effects.

Referring to FIGS. 1, 2, 3 and 9, when there are intervals in which arrival windows of three pins overlap each other, the operation timing analysis apparatus 10 of a semiconductor device may reflect an MIS coefficient (MC) for the timing arc.

Accordingly, the operation timing analysis apparatus 10 apply a GBA method when calculating timing for multiple paths associated with a cell having a plurality of input pins. Here, a slowest path and a fastest path may be stored. The operation timing analysis apparatus 10 of a semiconductor device may perform the GBA and find a path in which a problem may arise in delay timing of a signal. A path-based analysis (PBA) may be performed after finding the path that may cause a problem in the delay timing of the signal, and finally, the timing analysis may be completed.

The operation timing analysis apparatus 10 may determine a minimum value at an output pin O as shown in Table 3 below.

The operation timing analysis apparatus 10 of a semiconductor device may find the fastest path when signals flow from three input pins A, B, and C to the output pin O. Here, when the signals flow from a plurality of input pins to the output pin, finding the smallest delay, that is, the fastest path, may be referred to as an 'MIN operation'.

TABLE 3

Min arrival at 0 Min(0) = Min{A→0, B→0, C→0}
   A→0:A(e) + D1 * dMC(A, B, C)

TABLE 3-continued

B→0:B(e) + D2 * dMC(A, B, C)
C→0:C(e) + D3 * dMC(A, B, C)

The operation timing analysis apparatus 10 may analyze the timing by dividing the arrival windows on the basis of an overlap. Thus, unnecessary elements may be eliminated in the analysis of the timing.

In FIG. 9, the operation timing analysis apparatus 10 may divide an arrival window A associated with a pin A into a1, a2, and a3. The operation timing analysis apparatus 10 may then precisely calculate MIS effects in relation to the divided windows ai, bi, and ci as shown in Tables 4 and 5 below, where Table 4 is an example of calculating MIS effects according to the nominal delay and Table 5 is an example of calculating MIS effects according to variation-aware timing.

TABLE 4 a1→0: a1(e) + D1 * dMC(A, B) = 10 + 5 * 0.5 = 12.5 → minimum operation
a2→0: a2(e) + D1 * dMC (A, B, C) = 12 + 5 * 0.3 = 13.5
a3→0: a3(e) + D1 * dMC (A, C) = 15 + 5 * 0.3 = 16.5
b1→0: b1(e) + D2                = 5 + 8 = 13
b2→0: b2(e) + D2 * dMC (A, B) = 10 + 8 * 0.5 = 14
b3→0: b3(e) + D2 * dMC (A, B, C) = 12 + 8 * 0.3 = 14.4
c1→0: c1(e) + D3 * dMC (A, B, C) = 12 + 3 * 0.3 = 12.9
c2→0: c2(e) + D3 * dMC (A, C)    = 14 + 3 * 0.6 = 15.8
c3→0: c3(e) + D3                 = 15 + 3 = 18

As shown in Table 4, the operation timing analysis apparatus 10 may calculate MIS effects according to the nominal delay. The operation timing analysis apparatus 10 of a semiconductor device may predict a path 'a1→O: a1(e)+D1*dMC(A,B)' having the smallest delay among the paths flowing from the plurality of inputs a, b, and c to the output O and a delay time '10+5*0.5=12.5' of the path 'a1→O: a1(e)+D1*dMC(A,B)'.

TABLE 5 a1→0: a1(e) + D1 * dMC (A, B) − 3 * D1_ocv_sigma * dMCV (A, B) = (10 + 5 * 0.5) − (3 * 0.5 * 0.6) = 11.6
a2→0: a2(e) + D1 * dMC (A, B, C) − 3 * D1_ocv_sigma * dMCV (A, B, C) = (12 + 5 * 0.3) − (3 * 0.5 * 0.4) = 12.9
a3→0: a3(e) + D1 * dMC (A, C) − 3 * D1_ocv_sigma * dMCV (A, C) = (15 + 5 * 0.3) − (3 * 0.5 * 0.4) = 15.9
b1→0: b1(e) + D2 −3 * D2_ocv_sigma = (5 + 8) − (3 * 0.8) = 10.6 → minimum operation
b2→0: b2(e) + D2 * dMC (A, B) − 3 * D2_ocv_sigma * dMCV (A, B) = (10 + 8 * 0.5) − (3 * 0.8 * 0.6) = 12.56
b3→0: b3(e) + D2 * dMC (A, B, C) − 3 * D2_ocv_sigma * dMCV (A, B, C) = (12 + 8 * 0.3) − (3 * 0.8 * 0.4) = 13,44
c1→0: c1(e) + D3 * dMC (A, B, C) − 3 * D3_ocv_sigma * dMCV (A, B, C) = (12 + 3 * 0.3) − (3 * 0.3 * 0.4) = 12.54
c2→0: c2(e) + D3 * dMC (A, C) − 3 * D3_ocv_sigma * dMCV (A, C) = (14 + 3 * 0.6) − (3 * 0.3 * 0.7) = 15.17
c3→0: c3(e) + D3 − 3 * D3_ocv_sigma = (15 + 3) − (3 * 0.3) = 17.1

As shown in Table 5, the operation timing analysis apparatus 10 may calculate MIS effects according to the variation-aware timing. The operation timing analysis apparatus 10 of a semiconductor device may predict a path 'b1→: b1(e)+D2' having the smallest delay among the paths flowing from the plurality of inputs a, b, and c to the output O and delay time '5+8−3*0.8=10.6' of the path 'b1→O: b1(e)+D2'.

The operation timing analysis apparatus and method for use in the design and characterization of a semiconductor device according to an embodiment of the inventive concept may dynamically generate the MIS coefficients described above using information and current waveforms generated while the STA is performed.

Such operation timing analysis apparatus and method may obtain a merged current waveform in view of MIS effects. To this end, current waveforms in the form of 'a*t+b' may be merged using a piecewise linear model.

The operation timing analysis apparatus and method may iteratively calculate a value of the merged current while changing the time interval to calculate the merged current when the MIS occurs.

The operation timing analysis apparatus and method may perform the machine learning to predict the value of the OCV sigma (OCV_sigma).

The operation timing analysis apparatus and method may calculate MIS impact for a subset of defined windows rather than an entire arrival window. Thus, unnecessary elements that may otherwise intrude upon the minimum operation may be eliminated.

An operation timing analysis apparatus and method may dynamically generate MIS coefficients using information and current waveforms generated while STA is performed.

An operation timing analysis apparatus and method may obtain a merged current waveform when MIS effects are present. To this end, current waveforms in the form of a*t+b can be merged using a piecewise linear model.

An operation timing analysis apparatus and method may iteratively calculate a value of merged current while changing a time interval to calculate the merged current when MIS occurs.

An operation timing analysis apparatus and method may perform machine learning to predict a value of an OCV sigma.

An operation timing analysis apparatus and method may calculate MIS impact associated with a subset windows rather than an entire arrival window. Thus, unnecessary elements that occur in a minimum operation for finding the fastest path (the path with the minimum delay) can be eliminated.

While the embodiments of the inventive concept have been described with reference to the accompanying drawings, it should be understood by those skilled in the art that various modifications may be made without departing from the scope of the inventive concept and without changing essential features thereof. Therefore, the above-described embodiments should be considered in a descriptive sense only and not for purposes of limitation.

What is claimed is:

1. An apparatus for operation timing analysis of a semiconductor device including multi-input switching (MIS) elements considering MIS effects, the apparatus comprising:
   a timing input unit that generates an MIS model for each of the MIS elements; and
   an MIS analyzer that receives timing data for each of the MIS elements, and dynamically calculates an MIS coefficient on the basis of the MIS model and the timing data for each of the MIS elements.

2. The apparatus of claim 1, wherein the timing input unit loads the timing data and a design list for the semiconductor device, and generates the MIS model on the basis of the timing data and the design list.

3. The apparatus of claim 1, wherein the timing input unit generates a training set using results of an MIS simulation and a single input switching (SIS) simulation, generates a predictive model function for an on-chip variation (OCV) sigma of MIS on the basis of the training set, and generates an MIS variation model on the basis of the predictive model function for the OCV sigma of the MIS.

4. The apparatus of claim 3, wherein the MIS analyzer calculates a ratio of an MIS delay to an original delay without considering MIS effects on the basis of the predictive model function for the OCV sigma of the MIS effects, and generates a dynamic MIS coefficient on the basis of the ratio of the MIS delay and the original delay.

5. The apparatus of claim 1, wherein the timing data comprises at least one of arrival time data, slew data, load data, and delay data.

6. The apparatus of claim 1, wherein the timing input unit comprises a timing library database (DB) in which a function attribute for each of the MIS elements is stored, and the MIS analyzer analyzes the function attribute each of the MIS elements to acquire an MIS timing path whose delay is changed due to MIS effects.

7. The apparatus of claim 6, wherein the MIS analyzer generates MIS timing information indicating an input pin having minimum timing among a plurality of input pins for an MIS element.

8. An apparatus for operation timing analysis of a semiconductor device including multi-input switching (MIS) elements considering MIS effects, the apparatus comprising:
a static timing analysis (STA) module that generates timing data of each of the MIS elements; and
an MIS analyzer that receives an MIS model for each of the MIS elements, and dynamically calculates an MIS coefficient on the basis of the MIS model and the timing data,
wherein, the STA module performs STA considering MIS effects on the basis of the MIS coefficient.

9. The apparatus of claim 8, wherein the STA module obtains MIS timing paths for each of a plurality of input pins associated with a MIS element, analyzes arrival windows of the MIS timing paths, and calculates a timing variation due to MIS effects by applying the MIS coefficient when the arrival windows of the plurality of input pins overlap each other.

10. The apparatus of claim 8, wherein the MIS model for each of the MIS elements comprises an MIS variation model on the basis of a predictive model function for an OCV sigma of the MIS, and the STA module performs the STA considering the MIS on the basis of the MIS variation model.

11. A method of operation timing analysis of a semiconductor device including multi-input switching (MIS) elements considering MIS effects, the method comprising:
generating an MIS model for each of the MIS elements;
generating timing data without considering MIS effects for each of the MIS elements;
calculating an MIS coefficient of each of the MIS elements on the basis of the MIS model and the timing data; and
performing STA for each of the MIS elements in consideration of the MIS effects on the basis of the MIS coefficient.

12. The method of claim 11, wherein generating the MIS model for each MIS element comprises;
loading timing data and a design list for the semiconductor device; and
generating the MIS model on the basis of the loaded timing data and the design list.

13. The method of claim 11, wherein generating the MIS model for each MIS element comprises:
performing a MIS simulation;
performing a SIS simulation;
generating a training set using the MIS simulation and the SIS simulation;
generating a predictive model function for an OCV sigma of the MIS element on the basis of the training set; and
generating a MIS variation model on the basis of the predictive model function for the OCV sigma of the MIS element.

14. The method of claim 13, wherein generating the MIS variation model further comprises:
calculating a ratio between an MIS delay to an original delay without considering the MIS effect on the basis of the predictive model function for the OCV sigma of the MIS element, and
generating a dynamic MIS coefficient on the basis of the ratio of the MIS delay and the original delay.

15. The method of claim 11, wherein the timing data comprises at least one of arrival time data, slew data, load data, and delay data.

16. The method of claim 11, further comprising:
acquiring an MIS timing path by analyzing a function attribute of the MIS element; and
acquiring an MIS timing path having a changed delay due to MIS effects by analyzing a function attribute of the MIS element.

17. The method of claim 16, further comprising:
generating a merged current value by merging values of a plurality of currents flowing from a plurality of input pins to an output pin of the MIS element.

18. The method of claim 17, further comprising:
generating MIS timing information including a minimum operation indicating an input pin which has minimum timing among the plurality of input pins.

19. The method of claim 16, further comprising:
acquiring MIS timing paths for each of a plurality of input pins of the MIS element;
analyzing arrival windows of the MIS timing paths; and
calculating a timing variation due to MIS effects by applying the MIS coefficient when the arrival windows of the plurality of input pins overlap each other.

20. The method of claim 16, further comprising:
analyzing arrival windows for a plurality of input pins of the semiconductor device for MIS risky arcs;
setting the MIS coefficient to a default value when the arrival windows of the plurality of input pins do not overlap each other; and calculating a timing variation in relation to MIS effects.

* * * * *